Oct. 22, 1929.  J. M. MANN  1,732,760
TRANSMISSION
Filed June 18, 1928  2 Sheets-Sheet 1

Inventor
John M. Mann,
By
Attorney

Oct. 22, 1929.    J. M. MANN    1,732,760
TRANSMISSION
Filed June 18, 1928    2 Sheets-Sheet 2

Inventor
John M. Mann,
By
Attorney

Patented Oct. 22, 1929

1,732,760

UNITED STATES PATENT OFFICE

JOHN M. MANN, OF PHILADELPHIA, PENNSYLVANIA

TRANSMISSION

Application filed June 18, 1928. Serial No. 286,230.

The object of the invention is to provide a mechanism to serve as a connecting link between the prime mover and load as between the motor and propeller shaft of an auto-vehicle, but particularly as an industrial unit to serve to connect machines with their driving motors, so that a wide variation of speed for the load may be had at a high efficiency and without the necessity for making any speed variations in the driving motor; to provide a transmission in which the driver, or element connected to the prime mover, is in the form of a shaft having reciprocating operative connections with the driven to communicate motion to the same; to provide a transmission of this character in which the speed variation between driver and driven is effected by a change in the stroke of said reciprocating connections; and to provide a construction of this nature in which the change of stroke of said reciprocating connections is effected by a bodily adjustment axially of the driving member.

Figure 1:
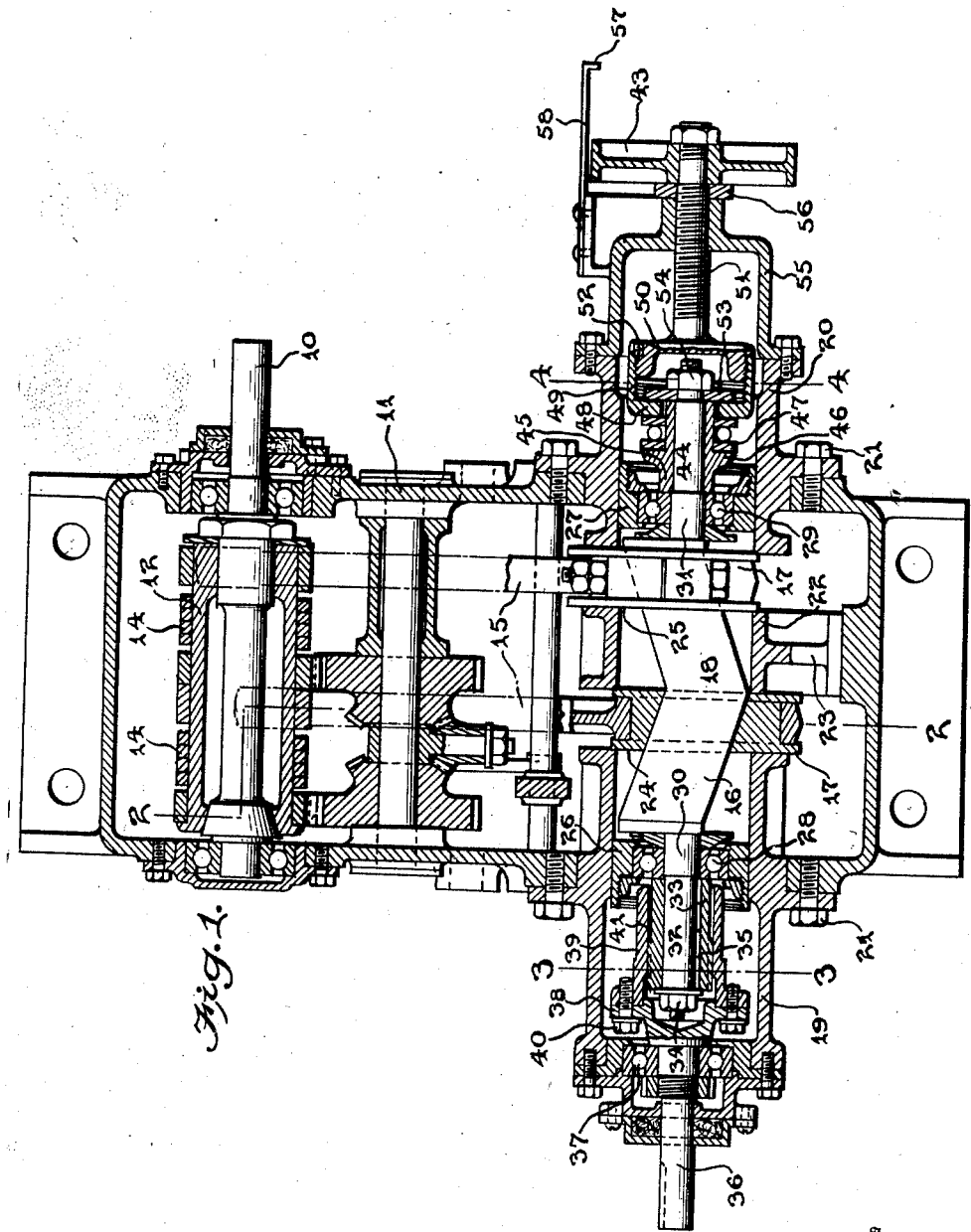

With this object in view the invention consists in a construction and combination of parts of which a preferred embodiment is illustrated in the accompanying drawings, wherein:

Figure 1 is a horizontal sectional view of a transmission constructed in accordance with the invention.

Figure 2:
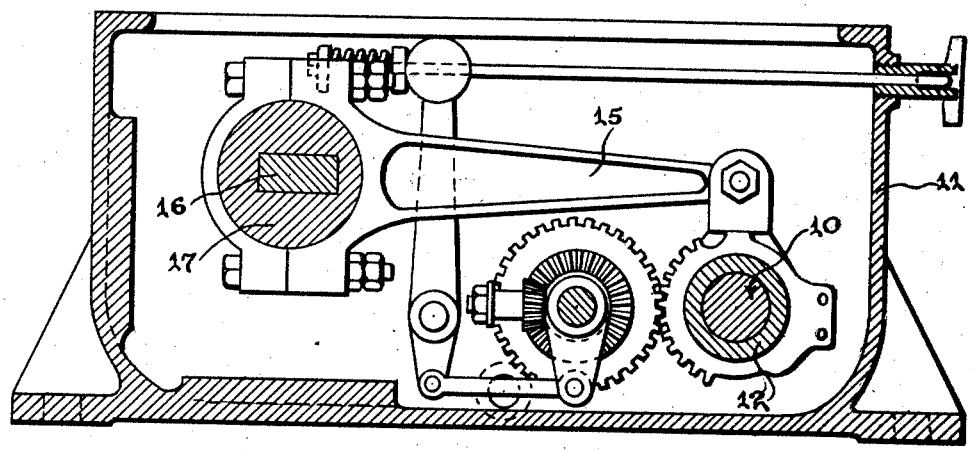
Figure 3:
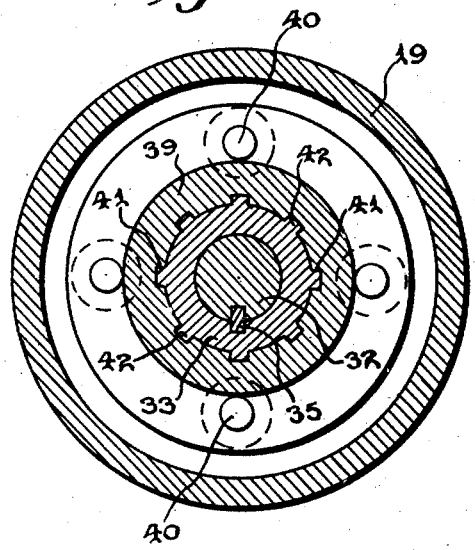
Figure 4:
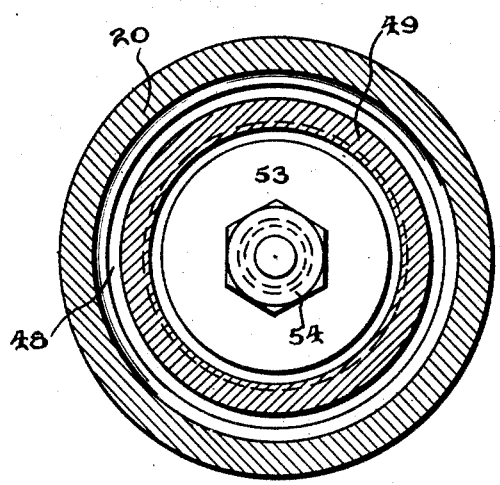

Figures 2, 3 and 4 are sectional views on the planes indicated by lines 2—2, 3—3 and 4—4 respectively of Figure 1.

The invention comprises the driving and driven members of which the latter embodies a shaft 10 journaled in the opposite side walls of a casing 11 and supporting within the casing a drum 12 equipped with circumferentially contractile clutches 14 with which the extremities of the connecting rods 15 are connected. The former or driving member comprises a crank shaft 16 on which are mounted the eccentrics 17 with which the remaining ends of the connecting rods are secured in the conventional manner.

In the illustrated embodiment the driving member comprises but two eccentrics and the driven member a corresponding number of clutches, the eccentrics being displaced angularly one hundred and eighty degrees. Obviously this number may be amplified to include as many eccentrics and clutches as desired, the eccentrics being arranged at uniform angular distances.

The crank portion 18 of the crank shaft is made cross-sectionally angular and the eccentrics are formed with correspondingly shaped eyes in which the crank portion effects a snug fit but not such as will prevent relative movement between the eccentrics and the crank portion to vary the degree of eccentricity with respect to the axis of rotation of the crank shaft.

The casing 11 is provided with axially aligned tubular housings 19 and 20 secured to its opposite side walls by cap screws as indicated at 21 and interiorly is formed with a ring-like housing member 22 supported by a web 23, this ring-like member being in axial alignment with the housings 19 and 20. The inner end of the housing 19 and the facing side of the ring member 22 form lateral abutments for the bearing members 24 of one of the eccentrics, while the opposite side of the ring member 22 and inner end of the housing 23 form lateral abutments for the bearing members 25 of the other eccentrics. This construction precludes any lateral movement of the eccentrics and the variation of their throw is effected by axial adjustment of the crank shaft. To provide for such adjustment a slide bearing 26 is mounted in the tubular housing 19 and a corresponding bearing 27 in the tubular housing 20, these slide bearings carrying removably seated ball bearings 28 and 29 in which the journals 30 and 31 of the crank shaft are supported. The crank shaft is provided with an extension 32 beyond the journal 30 and to this is secured a sleeve 33, axial movement of the sleeve on the extension being prevented by a castle nut 34 and angular movement relative to the extension being precluded by a key 35.

Since the crank shaft is mounted for axial adjustment and since it would not be practical to effect bodily movement of the driving motor or prime mover in doing this, the tubular housing 19 carries a stub shaft 36 for coupling with the driving motor, the shaft being journalled in a ball bearing 37 carried in the outer end wall of the tubular housing The inner end of the stub shaft is formed with a coupling flange 38 to which a driving sleeve 39 is secured, as by cap screws 40. The inner wall of the driving sleeve is formed with axial slots 41 with which feathers 42 on the sleeve 33 engage. The sleeve 39 is bored to effect a snug fit with the sleeve 33. This construction provides for relative axial movement between the stub shaft and crank shaft but precludes relative angular movement.

Within the tubular housing 20 is carried the means by which axial adjustment of the crank shaft is effected, this means being exteriorly actuable by means of a hand wheel 43.

The crank shaft beyond the journal 31 is formed with an extension 44 on which is carried a sleeve 45, the latter being formed with an integral collar 46 with which a thrust bearing 47 engages, the latter being also engaged with the inturned annular flange 48 of an interiorly threaded ring member 49 connected with the head 50 of the adjusting screw 51. The interior threads on the ring member 49 provide for its detachable connection with the head 50 and when attachment has been made the connection is secured by means of a lock screw 52.

The inturned annular flange 48 of the ring member 49 is laterally engaged with a washer 53 carried on the extension 44 and abutting the sleeve 45 on the end, both this washer and the sleeve being retained on the extension by the castle nut 54.

The adjusting screw 51 is threadingly engaged in a cap 55 secured to the outer end of the tubular housing and to the outer end of this screw the hand wheel 43, a lock nut 56 being engaged with the screw for movement into abutting engagement with the outer end of the cap 55 to lock the screw against rotation when desired. An outer abutment member consisting of the inturned extremity 57 of an arm 58 secured to the cap 55 serves to limit the axial adjustment of the screw 51 in one direction and the outer end of the cap 55 to limit the adjustment in the other direction, the one by engagement with the hand wheel adjacent its periphery and the other by engagement with the hub of the wheel, the lock nut 56 being considered the outer end of the cap, since it is always held close to the same and either jammed against the cap to lock the screw against rotation or slightly loosened to permit rotation of the screw.

Since the eccentrics are precluded from any lateral movement whatever, it is apparent that the axial adjustment of the crank shaft will operate to vary their throw and the crank shaft may be positioned to dispose the eccentrics at high points on the crank or at points thereon where their axes are coincident with the axis of the crank shaft, or at any points therebetween. The first position will provide for the greatest strokes of the connecting rods, the second will impart no reciprocating movement whatever to the connecting rods, and the third will give a stroke less than the extreme stroke and depending for length upon the relative position of the crank and the eccentrics.

The ring 49 provides an operative connection between the adjusting screw 51 and the crank shaft that will permit relative rotation of the two but preclude relative axial movement. Hence, when the screw is adjusted by turning the hand wheel 43, the crank shaft is moved axially and the selected position may be retained by engaging the lock nut 56 tightly with the outer end of the cap 55, the lock nut of course being loosened during the interval of adjustment.

The invention having been described what is claimed as new and useful is:

1. A mechanism for the purpose indicated comprising a driving shaft provided with a crank portion, eccentrics mounted upon the crank portion for relative sliding movement thereon, means engaging the eccentrics to prevent lateral movement of the same, and means for adjusting the shaft by effecting bodily movement of the same axially, the shaft being carried in slidably mounted bearings and the adjusting means consisting of a screw and a support for the same, the screw having a connection with the shaft permitting relative angular but precluding relative axial movement.

2. A mechanism for the purpose indicated comprising a drive shaft provided with a crank portion, eccentrics mounted on said crank portion for relative lateral sliding movement thereon, means engaging the eccentric to prevent lateral movement, slidably mounted bearings in which the shaft is journaled, a stub shaft coupled to said shaft to prevent relative angular movement but permitting relative axial movement, and an adjusting screw operatively connected with the first said shaft at the end remote from the stub shaft to effect bodily movement axially of the former.

3. A mechanism for the purpose indicated comprising a drive shaft having a crank portion, eccentrics mounted on the crank portion for relative movement with the crank shaft axially of the same, lateral bearings for the eccentrics precluding lateral movement thereof, slidably mounted bearings in which the crank shaft is journaled, and means for effecting bodily axial movement of the crank shaft and comprising a screw threadingly engaged in a fixed member and having a coupling connection with one end of the shaft permitting relative angular movement of the two but precluding relative axial movement.

4. A mechanism for the purpose indicated comprising a drive shaft having a crank portion, eccentrics mounted on the crank portion for relative movement with the crank shaft axially of the same, lateral bearings for the eccentrics precluding lateral movement thereof, slidably mounted bearings in which the crank shaft is journaled, and means for effecting bodily axial movement of the crank shaft and comprising a screw threadingly engaged in a fixed member and having a coupling connection with one end of the shaft permitting relative angular movement of the two but precluding relative axial movement, a hand wheel engaged with the screw at the end remote from the coupling connection with the crank shaft and spaced fixed stops for the hand wheel.

5. A mechanism for the purpose indicated comprising a drive shaft having a crank portion, eccentrics mounted on the crank portion for relative movement with the crank shaft axially of the same, lateral bearings for the eccentrics precluding lateral movement thereof, slidably mounted bearings in which the crank shaft is journaled, and means for effecting bodily axial movement of the crank shaft and comprising a screw threadingly engaged in a fixed member, having a coupling connection with one end of the shaft permitting relative angular movement of the two but precluding relative axial movement, a hand wheel engaged with the screw at the end remote from the coupling connection with the crank shaft and spaced fixed stops for the hand wheel of which one comprises a lock nut carried by the screw and engageable with the fixed member and the other an arm having an inturned extremity engageable with the rim of the wheel.

6. A mechanism for the purpose indicated comprising a casing, axially aligned tubular housings secured to opposite side walls of the casing, a crank shaft having a crank portion spanning the facing ends of the tubular housings, eccentrics mounted on the crank portion between said housings and having lateral bearing members precluding lateral movement thereof, bearings slidably mounted in said housings, the crank shaft being journaled in said bearings, and axial adjusting means carried by one of the housings for effecting bodily movement of the crank shaft axially.

7. A mechanism for the purpose indicated comprising a casing, axially aligned tubular housings secured to opposite side walls of the casing, a crank shaft having a crank portion spanning the facing ends of the tubular housings, eccentrics mounted on the crank portion between said housings and having lateral bearing members precluding lateral movement thereof, bearings slidably mounted in said housings, the crank shaft being journaled in said bearings, and axial adjusting means carried by one of the housings for effecting bodily movement of the crank shaft axially, the remaining housings having a stub shaft journaled therein and having a telescoping coupling with the crank shaft to permit relative axial movement between the two but precluding relative angular movement.

In testimony whereof he affixes his signature.

JOHN M. MANN.